United States Patent [19]
Weigel

[11] Patent Number: 6,146,023
[45] Date of Patent: Nov. 14, 2000

[54] OPTICAL MULTI-CONNECTOR

[75] Inventor: Hans-Dieter Weigel, Berlin, Germany

[73] Assignee: Infineon Technologies AG, Munich, Germany

[21] Appl. No.: 09/107,357

[22] Filed: Jun. 30, 1998

[30] Foreign Application Priority Data

Jun. 30, 1997 [DE] Germany .......................... 197 28 960

[51] Int. Cl.[7] .................................................. G02B 6/38
[52] U.S. Cl. .................................. 385/55; 385/59; 385/60; 385/62; 385/77; 385/78; 385/81; 385/139
[58] Field of Search .................................. 385/55, 56, 58, 385/60, 59, 62, 66, 70, 72, 77, 78, 81, 84, 87, 139, 71

[56] References Cited

U.S. PATENT DOCUMENTS

| | | | |
|---|---|---|---|
| 5,265,182 | 11/1993 | Hartley | 385/77 |
| 5,581,645 | 12/1996 | Gehri | 385/78 |
| 5,675,682 | 10/1997 | De Marchi | 385/77 |
| 5,692,080 | 11/1997 | Lu | 385/60 |
| 5,930,426 | 7/1999 | Harting et al. | 385/56 |

FOREIGN PATENT DOCUMENTS

| | | | |
|---|---|---|---|
| 0485196B1 | 12/1994 | European Pat. Off. | 385/55 X |
| 19539549C1 | 12/1996 | Germany | 385/55 X |
| 19533498A1 | 3/1997 | Germany | 385/55 X |

*Primary Examiner*—Brian Healy
*Attorney, Agent, or Firm*—Herbert L. Lerner; Laurence A. Greenberg; Werner H. Stemer

[57] ABSTRACT

A base housing receives a plurality of optical plug connectors. Each of the connectors is prestressed in the axial insertion direction with a respective spring. A supplementary housing part is connectible to the base housing in a predetermined connecting position. The supplementary housing part is formed with support faces. The supplementary housing part is movable relative to the base housing in the insertion direction in such a way into the connecting position that the support faces carry the rear spring ends along with them and in the process prestress the springs.

8 Claims, 2 Drawing Sheets

OPTICAL MULTI-CONNECTOR

BACKGROUND OF THE INVENTION

FIELD OF THE INVENTION

The invention lies in the field of coupling optical waveguides (hereinafter also called optical conductors or fibers) with plug connectors, in particular by means of plug connectors for terminating a plurality of optical fiber ends at a time. Such plug connectors have recently also become known by the term MT ferrules. With regard to the replicability and precision of alignment of the optical fiber ends, received by the plug connectors, optical plug connections make the maximum possible demands of the various coupling partners (such as corresponding optical fiber ends or electrooptical components).

The invention pertains to an optical multi-connector, having a base housing for receiving a plurality of optical fiber plug connectors, which are each prestressed by a respective spring in the axial insertion direction toward the front side of the base housing. A supplementary housing part is joined to the base housing in a predetermined connecting position.

One such multi-connector has become known from German Patent DE 195 39 549 C1. That connector includes a base housing with a plurality of receiving chambers corresponding in number to the plug connectors to be received. The plug connectors, for instance so-called multifiber ferrules (cf. European Patent Specification EP 0 485 196 B1), are supported, counter to the force of individual helical springs for each ferrule, in their respective receiving chamber axially parallel and axially displaceably in the insertion direction; their freedom of axial movement is defined in each case by a stop located toward the front (in terms of the insertion direction). To create spring bias, the individual springs are braced by their front end on the respectively associated plug connector, while the respective other, rear end of each helical spring, under compression of the spring, rests on a rear boundary wall of the respective receiving chamber. A supplementary housing part, which by way of example may be embodied as a cover that closes off the base housing, is connected to the base housing in a predetermined connecting position.

The prior art multi-connector is problematic with regard to the introduction of the individual plug connectors, and the springs associated with them, into the receiving chambers. In other words, during the assembly of the system, each spring must be individually compressed and then carefully introduced together with the plug connector into the chamber.

Furthermore, external jolts or jarring during subsequent production steps can, in the worst case, cause the prestressed spring to snap out of the respective receiving chamber.

SUMMARY OF THE INVENTION

It is accordingly an object of the invention to provide a optical multi-connector, which overcomes the above-mentioned disadvantages of the prior art devices and methods of this general type and which is improved from a production standpoint and is easier to manipulate.

With the foregoing and other objects in view there is provided, in accordance with the invention, an optical multi-connector, comprising:

a base housing with a front side and defining an axial insertion direction;

a plurality of optical fiber plug connectors received in the base housing;

a plurality of springs each for biasing a respective one of the optical fiber plug connectors in the axial insertion direction toward the front side of the base housing;

a supplementary housing part connected to the base housing in a predetermined connecting position;

the supplementary housing part being formed with support faces for supporting the springs at rear ends thereof; and the supplementary housing part being movable relative to the base housing along the insertion direction into the predetermined connecting position such that the support faces carry the rear ends of the springs forward and compress the springs.

In other words, the objects of the invention are satisfied in that the supplementary housing part has support faces for the rear ends of the springs, and that the supplementary housing part is movable relative to the base housing in the insertion direction in such a way into the connecting position that the support faces carry the rear spring ends along with them and in the process prestress the springs.

A first substantial advantage of the multi-connector according to the invention is that first, substantially simplified preassembly is possible, in which the plug connectors can be introduced into the base housing, each with their associated spring initially still in the relaxed state. The prestressing of the springs can take place in a later production step. The risk of springs snapping out of the base housing because of their prestressing is averted by the housing part, which is preferably embodied as a cover. Another substantial advantage of the multi-connector of the invention is that in the motion of the housing part relative to the base housing, until the connecting position is reached, the support faces of the housing part simultaneously carry the rear spring ends with them in the insertion direction. As a result, in the production step (positioning operation) that is necessary anyway in the assembly of the housing parts, an implicit and joint prestressing of the individual springs advantageously occurs at the same time. The multi-connector of the invention is thus distinguished by a considerably reduced number of production steps and by manipulation that makes for easier assembly, compared with the above-described prior art multi-connector.

In accordance with an added feature of the invention, the multi-connector includes one or more ribs formed on the supplementary housing part and extending crosswise to the insertion direction, the support faces being formed on the rib or ribs. This embodiment of the invention is advantageous in terms of the structural size of the multi-connector housing in the insertion direction and is preferred from a production standpoint, particularly when the housing parts are made of plastic.

In accordance with an additional feature of the invention, the ribs have gaps formed in between, and optical fibers extend through the gaps and to the plug connectors. This embodiment of the invention results in an especially protected, elegant layout of the optical fibers leading to the plug connectors.

Particularly with an increasing number of springs or higher spring constants, the demands for flexibility of the support faces rise. In accordance with another feature of the invention, therefore, the base housing is formed with a support for the rib or ribs.

In accordance with a further feature of the invention, the base housing and the supplementary housing part are connected to one another in the central region of the multi-connector. This avert an undesirable change in geometry of the multi-connector, particularly when there is a large number of springs with comparatively high spring constants. The longitudinal forces resulting from the prestressed springs can in the least favorable case lead to bulging of the base housing and/or the supplementary housing part. This is counteracted by connecting them in the central region of the base housing.

In accordance with a concomitant feature of the invention, the supplementary housing part is formed with rear grip faces. The grip faces prove advantageous in the operation of slipping the supplementary housing part onto the base housing during assembly, and in manipulating the multi-connector as needed during operation.

Other features which are considered as characteristic for the invention are set forth in the appended claims.

Although the invention is illustrated and described herein as embodied in an optical multi-connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
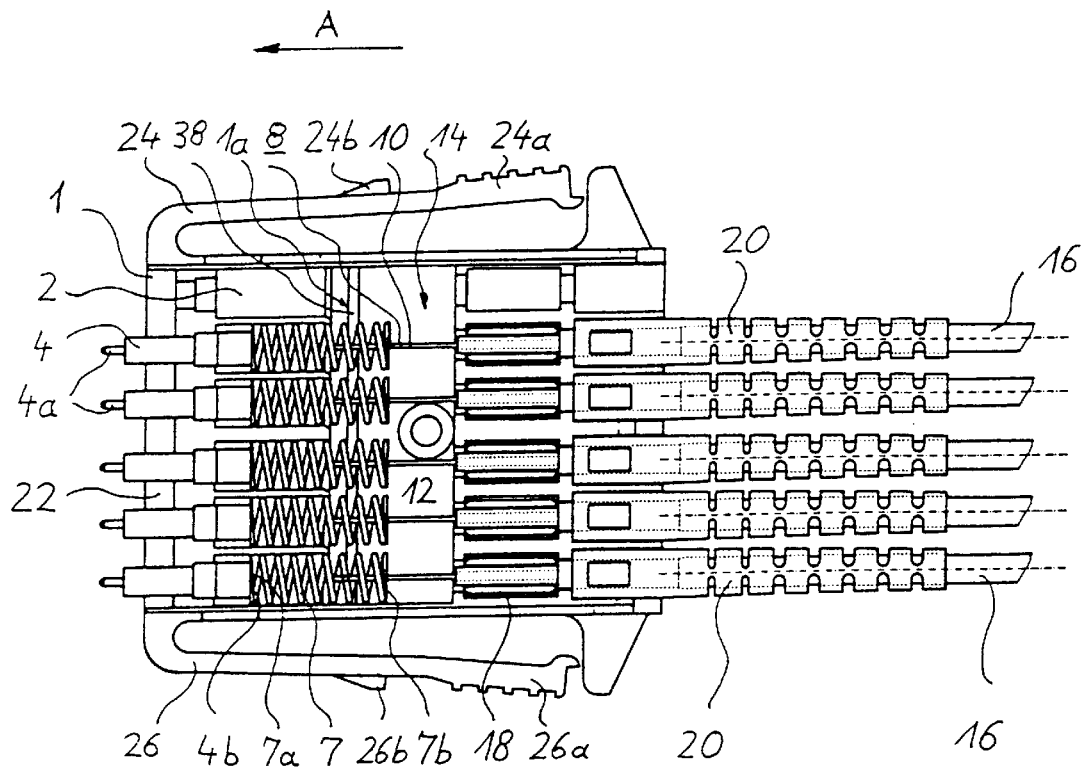
FIG. 1 is a plan view onto the open base housing of a multi-connector of the invention.

Referring now to the figures of the drawing in detail and first, particularly, to FIG. 1 thereof, there is seen a multi-connector with a base housing 1, which is made of plastic, for instance. The base housing 1 has six receiving chambers 2. Inserted into each receiving chamber 2 is a terminating multiple plug connector (MT ferrule) 4 capable of coupling a plurality of optical fibers. The uppermost chamber is shown unequipped, so as to illustrate the design of the chamber. Each plug connector is provided with centering pins 4a—as described in EP 0 485 196 B1—for precise alignment with a respective coupling partner of non-illustrated plug connectors with corresponding centering bores. Each plug connector, together with a rear face 4b, forms a stop for a first end 7a of a respective helical spring 7. In the preassembled state as shown, the springs 7 are in the relaxed state.

Extending through each spring interior is a respective optical fiber band 8, having a number of individual optical fibers 10 (e.g. 12 fibers) that are received and terminated in a jointly coupleable manner by the respective plug connector. The band 8 emerges from the further, rear end 7b of the respective spring 7, that is, the rear end in terms of the insertion direction A. The optical fiber band 8 passes through a hollow chamber 12 in the central region 14 of the base housing 1 and at the rear enters a respective individual outgoing optical fiber cable sheath 16. Each cable sheath 16 extends as far as its own mount 18 in which individual-cable tension relief elements are securely fixed against axial tension. Further details, in this regard, may be gleaned from German patent DE 195 39 549 C1. The outgoing cables are surrounded by individual kink protection sleeves 20. The base housing also has on its face end part of an encompassing collar 22 and lateral locking levers 24, 26 with grip faces 24a, 26a and locking protrusions 24b, 26b, for locking it in a coupling sleeve (FIG. 3), for instance.

Figure 2:
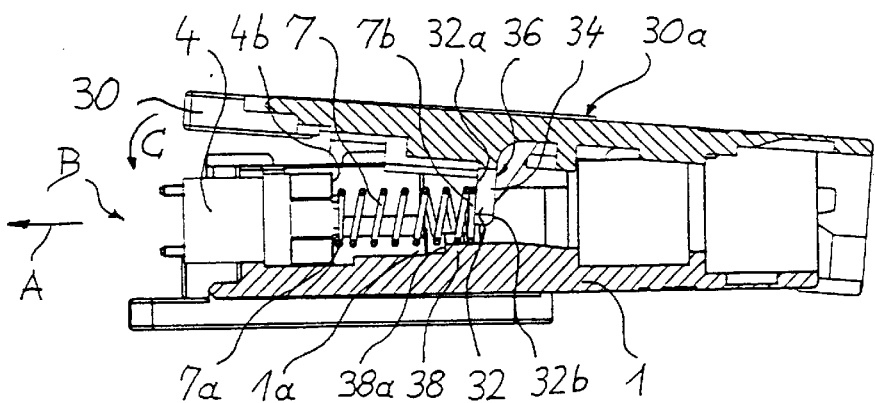
FIG. 2 is a longitudinal section of the base housing and a supplementary housing part during the relative positioning.

FIG. 2 (for the sake of clarity, the optical fiber tapes are not shown) in a longitudinal section shows both the base housing 1, already explained at length in conjunction with FIG. 1, and a supplementary housing part 30. The supplementary housing part 30 is shown in an intermediate position, during a phase of the assembly process from which it is moved farther forward as assembly continues, in the insertion direction A toward the front of the base housing 1, until it has reached a position in which it can be connected to the base housing. The base housing together with the supplementary housing part 30 form one complete housing (FIG. 3).

The supplementary housing part 30 has a cover face 30a with lateral protrusions in the middle, which serve to center the multi-connector and support it directly in the introduction shaft, formed by a coupling part (FIG. 3), in the event of transverse force effects. The supplementary housing part 30 has a vertical rib 32, extending transversely to the insertion direction A, which with a vertical rib plane on the front forms support faces 32a, 32b for the rear ends 7b of the springs 7. The rib 32 is comblike with vertically extending gaps or slits (such as 34), so that through openings 36 are created for the optical fiber bands 8. As FIGS. 1 and 2 show, the base housing 1 has an internal crosswise indentation or shoulder 1a. The crosswise indentation may be bounded at the rear, in terms of the insertion direction A, by a raised transverse rib or a protuberance 38.

As the assembly process continues, the supplementary housing part 30 is moved farther forward in the insertion direction A, and the rear ends 7b of the springs 7 that now rest on the support faces 32a, 32b are moved toward the front side B in the process. As a result, the springs 7 are prestressed jointly with the motion of the supplementary housing part. To stabilize the rib 32 against the bending stresses dictated by the spring forces, the rib 32 on reaching the final joining position is located with its rear face (for instance, 32b) on the front boundary plane 38a of the indentation 1a or protuberance 38. To that end, on reaching the connecting position the housing part 30 can be pivoted in the direction of the arrow C and lowered slightly vertically onto the base housing, so that the final positioning operation will not be impaired by a collision between the rib 32 and the protuberance 38. The rib 32 is thus protected against bending stresses even if in the coupling operation during operation additional axial forces that lead to further spring compressions act on the end faces of the plug connectors.

Figure 3:
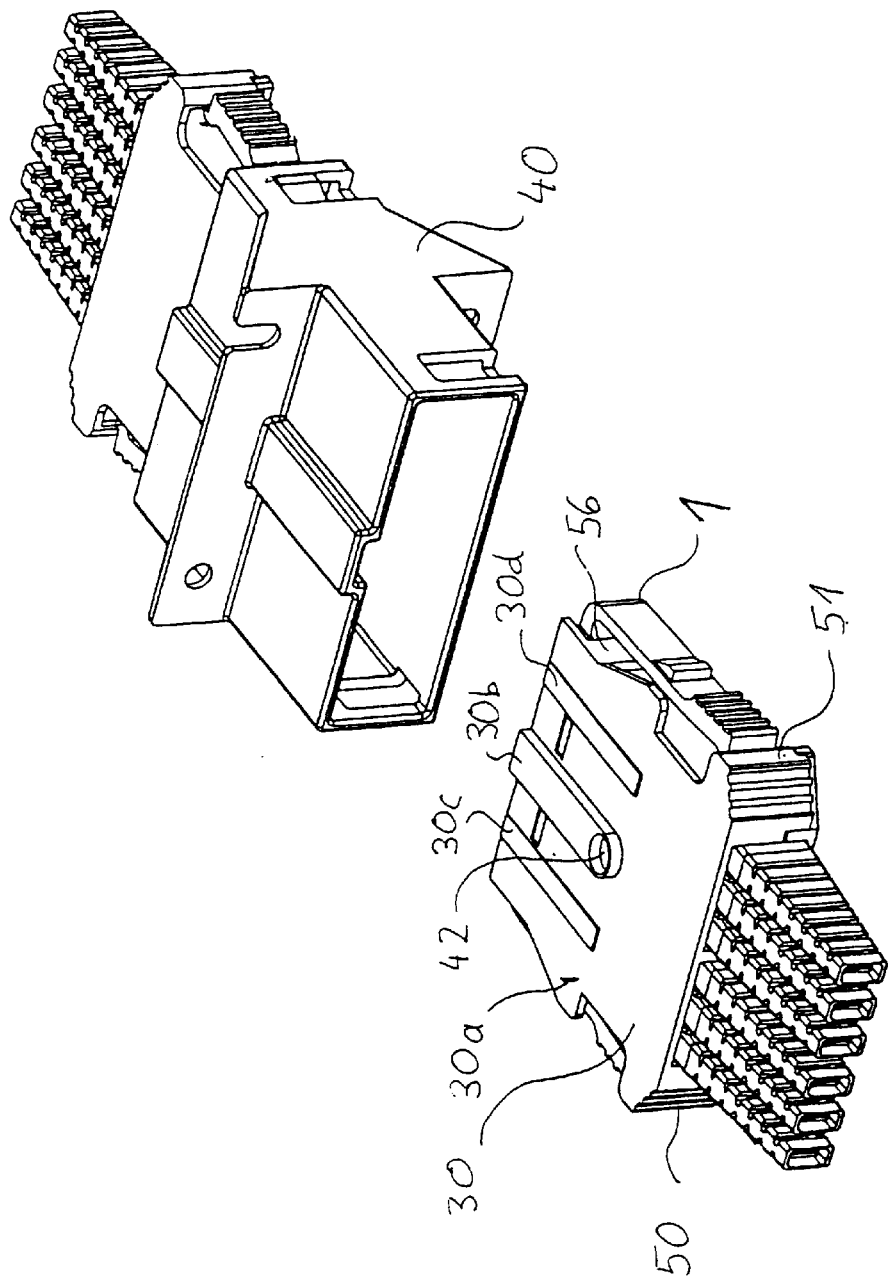
FIG. 3 is a perspective view of two approaching multi-connectors with a coupling sleeve.

FIG. 3 shows by way of example two multi-connectors of the invention, with the outgoing cables not shown, for the sake of simplicity. Since the connection partners are not yet inserted into a coupling sleeve 40, a longitudinally symmetrical coding rib 30b, guide ribs 30c, 30d disposed symmetrically with it, and a through opening 42 disposed in the central region of the multi-connector can all be seen on the cover face 30a. A self-tapping screw is screwed into the through opening 42, and the screw cuts into a core hole cylinder provided on the bottom plate of the base housing 1. As a result, the base housing 1 and the supplementary housing part 30 are connected, and any possible bulging under strong spring forces is counteracted.

For the sake of better manipulation both during the assembly process and in the insertion and unlocking process, the supplementary housing part 30 has grip faces 50, 51 on its rear, beveled corners. Alternatingly disposed detent hooks such as 56 and corresponding detent bays 57 act as further connecting elements between the base housing 1 and the housing part 30.

I claim:

1. An optical multi-connector, comprising:

a base housing with a front side and defining an axial insertion direction;

a plurality of optical fiber plug connectors received in said base housing;

a plurality of springs each for biasing a respective one of said optical fiber plug connectors in the axial insertion direction toward the front side of said base housing;

a supplementary housing part connected to said base housing in a predetermined connecting position;

said supplementary housing part being formed with support faces for supporting said springs at rear ends thereof; and said supplementary housing part being movable relative to the base housing along the insertion direction into the predetermined connecting position such that said support faces carry the rear ends of said springs forward and compress said springs.

2. The multi-connector according to claim 1, including a rib formed on said supplementary housing part and extending crosswise to the insertion direction, said support faces being formed on said rib.

3. The multi-connector according to claim 1, including a plurality of ribs formed on said supplementary housing part and extending crosswise to the insertion direction, said support faces being formed on said ribs.

4. The multi-connector according to claim 3, wherein said ribs have gaps formed in between, and wherein optical fibers extend through said gaps to said plug connectors.

5. The multi-connector according to claim 3, wherein said base housing is formed with a support for said ribs.

6. The multi-connector according to claim 2, wherein said base housing is formed with a support for said rib.

7. The multi-connector according to claim 1, wherein said base housing and said supplementary housing part define a central region of the multi-connector, and wherein said base housing and said supplementary housing part are connected to one another in the central region of the multi-connector.

8. The multi-connector according to claim 1, wherein said supplementary housing part is formed with rear grip faces.

* * * * *